United States Patent
Potluri et al.

(10) Patent No.: US 10,429,026 B2
(45) Date of Patent: Oct. 1, 2019

(54) LAMP ASSEMBLY WITH ANISOTROPIC HEAT SPREADER AND VEHICLE HAVING THE SAME

(71) Applicant: GM GLOBAL TECHNOLOGY OPERATIONS LLC, Detroit, MI (US)

(72) Inventors: Vipul Potluri, Warren, MI (US); Carlos N. Czirmer, Rochester, MI (US); Steven J. Kropfreiter, Warren, MI (US)

(73) Assignee: GM Global Technology Operations LLC, Detroit, MI (US)

(*) Notice: Subject to any disclaimer, the term of this patent is extended or adjusted under 35 U.S.C. 154(b) by 181 days.

(21) Appl. No.: 15/625,208

(22) Filed: Jun. 16, 2017

(65) Prior Publication Data

US 2018/0363878 A1    Dec. 20, 2018

(51) Int. Cl.

| | |
|---|---|
| F21S 45/47 | (2018.01) |
| F21S 43/33 | (2018.01) |
| F21S 41/25 | (2018.01) |
| F21S 41/37 | (2018.01) |
| F21S 43/14 | (2018.01) |
| F21S 41/141 | (2018.01) |
| F21S 43/20 | (2018.01) |

(Continued)

(52) U.S. Cl.
CPC ............. *F21S 45/47* (2018.01); *F21S 41/141* (2018.01); *F21S 41/148* (2018.01); *F21S 41/25* (2018.01); *F21S 41/37* (2018.01); *F21S 43/14* (2018.01); *F21S 43/26* (2018.01); *F21S 43/33* (2018.01); *F21S 45/20* (2018.01); *B60Q 1/04* (2013.01); *B60Q 1/22* (2013.01); *B60Q 1/30* (2013.01); *B60Q 1/44* (2013.01)

(58) Field of Classification Search
CPC ... B60Q 1/04; B60Q 1/22; B60Q 1/30; B60Q 1/44; F21S 41/141; F21S 41/25; F21S 41/37; F21S 43/14; F21S 43/26; F21S 43/33; F21S 45/47
See application file for complete search history.

(56) References Cited

U.S. PATENT DOCUMENTS

| 7,635,206 B2* | 12/2009 | Huang | F21S 41/147 |
| | | | 362/296.01 |
| 9,970,624 B2* | 5/2018 | Shibata | B60Q 1/0683 |

(Continued)

OTHER PUBLICATIONS

Martin Smalc, et al., Interpack 2005-73073, "Thermal Performance of Natural Graphite Heat Spreaders", Proceedings of InterPACK '05, ASME InterPACK '05, Jul. 17-22, San Francisco, CA.

*Primary Examiner* — Tsion Tumebo
(74) *Attorney, Agent, or Firm* — Quinn IP Law

(57) ABSTRACT

A lamp assembly includes an outer lens, a lamp housing connected to the outer lens, a projector assembly having a projector lens, a lighting source, and an anisotropic heat spreader. The lighting source is adjacent to and partially within the projector assembly, and has a printed circuit board (PCB) connected to one or more light-emitting diodes, each emitting the light. The heat spreader, for instance a sheet of polycrystalline graphite, is connected to the PCB and extends beyond a surface area of the PCB into a lamp cavity. The heat spreader is configured to direct heat away from an LED junction toward a predetermined lower temperature zone of the lamp cavity. A vehicle includes a body and the lamp assembly.

20 Claims, 2 Drawing Sheets

(51) Int. Cl.
*F21S 45/20* (2018.01)
*F21S 41/148* (2018.01)
*B60Q 1/04* (2006.01)
*B60Q 1/22* (2006.01)
*B60Q 1/30* (2006.01)
*B60Q 1/44* (2006.01)

(56) References Cited

U.S. PATENT DOCUMENTS

| | | | | |
|---|---|---|---|---|
| 2006/0239022 A1* | 10/2006 | Inaba | ................... | B60Q 1/0041 362/538 |
| 2009/0206063 A1* | 8/2009 | Pershin | ................... | H05H 1/34 219/121.49 |
| 2009/0231851 A1* | 9/2009 | Lai | ................... | F21V 29/004 362/253 |
| 2010/0012171 A1* | 1/2010 | Ammar | ................ | H01L 31/052 136/246 |
| 2011/0228536 A1* | 9/2011 | Im | ................... | F21S 41/192 362/249.06 |
| 2011/0254446 A1* | 10/2011 | Tominaga | ............... | F21V 29/71 315/82 |
| 2012/0007506 A1* | 1/2012 | Ohmi | ................... | B60Q 1/076 315/77 |
| 2012/0008306 A1* | 1/2012 | Sasaki | ................... | H01L 33/508 362/84 |
| 2012/0063156 A1* | 3/2012 | Yasuda | ................ | B60Q 1/0035 362/516 |
| 2012/0314436 A1* | 12/2012 | Inoue | ................... | F21V 29/763 362/487 |
| 2014/0063829 A1* | 3/2014 | Kushalappa | ............ | F21S 45/48 362/508 |
| 2014/0218950 A1* | 8/2014 | Kim | ................... | F21S 45/60 362/509 |
| 2015/0003083 A1* | 1/2015 | Uehara | ................. | H05K 1/056 362/418 |
| 2015/0008588 A1* | 1/2015 | Kim | ................... | H01L 23/373 257/774 |
| 2015/0034976 A1* | 2/2015 | Kim | ................... | H05K 1/0207 257/88 |
| 2015/0036369 A1* | 2/2015 | Kim | ................... | F21S 45/48 362/487 |
| 2015/0103545 A1* | 4/2015 | Kato | ................... | B22D 19/00 362/509 |
| 2016/0312978 A1* | 10/2016 | Park | ................... | F21V 7/0033 |
| 2016/0327832 A1* | 11/2016 | Zhu | ................... | G02F 1/133514 |

* cited by examiner

LAMP ASSEMBLY WITH ANISOTROPIC HEAT SPREADER AND VEHICLE HAVING THE SAME

INTRODUCTION

Electric lamp assemblies are used as artificial sources of illumination in a host of mobile and stationary systems. For example, a lamp assembly may be configured to illuminate a roadway, building, or work area, or to provide accent or task lighting. Chip-mounted light-emitting diodes (LEDs) are often used in lamp assemblies as relatively long lasting and efficient light sources. In an LED, photons are released when the LED is energized by an applied voltage. This unique phenomenon occurs in response to a combination of free electrons with positive "holes" at or adjacent to a junction between positively and negatively doped semiconductor materials. The temperature of the junction affects the life expectancy of the LED. As a result, heat generated within the semiconductor materials of an LED chip is typically absorbed and dissipated using a large metallic or plastic heat sink positioned adjacent to the LED chip. In higher power applications, an electric fan may be used facilitate air circulation and reduce condensation within the lamp assembly.

SUMMARY

Disclosed herein is a lamp assembly having an anisotropic heat spreader, as well as a vehicle or other system including the lamp assembly. The lamp assembly, when constructed as described herein, is intended to help reduce the need for the above-described electric fan and/or heat sink. In order to achieve such ends, the lamp assembly is equipped with a passive anisotropic heat spreader, with the term "anisotropic" referring to the material property of having a significantly higher thermal conductivity along length and width dimensions of the heat spreader relative to the heat spreader's depth or thickness.

The heat spreader may be initially embodied as a substantially flat/planar material piece or layer that is then cut, shaped, and/or contoured in an application-specific manner so as to transfer heat along the length and width of the heat spreader away from the lamp assembly, and to thereby promote the flow of heat to lower temperature zones within the lamp assembly. The present disclosure has the overarching goal of minimizing or preventing condensation within the lamp assembly, particularly on internal surfaces of a lens thereof, while at the same time reducing the lamp assembly's overall weight, complexity, and energy consumption.

The lamp assembly includes an outer lens, a lamp housing, a projector assembly, and a lighting source. The outer lens is connected to the housing such that the outer lens and housing together define one or more lamp cavities. The projector assembly includes a projector lens positioned aft of the outer lens, i.e., to the rear of or in a direction opposite a direction of the lamp's light propagation. The projector assembly may also include an optional reflective surface configured to reflect incident light toward and through the projector lens. In other embodiments, the light may be directed into the projector lens without such reflection. The lighting source is positioned partially within the projector assembly, and may include a printed circuit board (PCB) connected to one or more light-emitting diodes or LEDs. The LEDs are configured to emit the light when energized by a battery or other voltage supply.

The PCB is connected to the anisotropic heat spreader described generally above. The heat spreader is connected to the PCB, and extends beyond a surface area of the PCB and into the lamp cavity or cavities over a distance sufficient for directing heat away from a relatively high temperature LED junction of the PCB and toward a predetermined lower temperature zone of the lamp cavity, i.e., with the zone temperature being substantially lower than that of the LED junction.

The anisotropic heat spreader may be initially embodied, prior to formation into the lamp assembly, as a flexible sheet of a polycrystalline material, e.g., polycrystalline graphite or diamond. The sheet may have, as the desired anisotropic properties, an in-plane thermal conductivity in excess of 650 or 700 watts per meter-Kelvin (W/mK), with "in-plane" referring to a plane defined by the length and width or X and Y dimensions of the heat spreader using an example XYZ Cartesian coordinate system. The heat spreader may have a significantly lower thermal conductivity through its thickness (along its Z axis), e.g., 1% to 10% of the thermal conductivity in the X and Y/length-width dimensions. The thickness of the heat spreader may vary with the intended application, with an example thickness range of 80-120 micrometers (μm) being useful in certain representative headlight embodiments.

The lamp assembly in certain embodiments may be characterized by an absence of an electronic fan of the type used for promoting airflow and reducing condensation. Similarly, the lamp assembly may be optionally characterized by an absence of a radiating metal or plastic heat sink, although other embodiments may retain a fan and/or heat sink of a reduced size or mass.

The lamp assembly may be connectable to a vehicle body, such as to a front or rear end of a motor vehicle in an example vehicle headlight or taillight application. Other vehicular or non-vehicular lighting applications may benefit from the present disclosure, including outdoor lighting applications in which a relatively high temperature gradient exists between the outside and inside of the lamp assembly, or in which environmental conditions tend to promote undesirable condensation within the lamp assembly.

A vehicle is also disclosed that, according to an example embodiment, includes a vehicle body with front and rear ends, as well as the lamp assembly noted above. The lamp assembly in this embodiment is connected to the vehicle body at the front or back end.

A lamp assembly according to another possible embodiment includes an outer lens constructed of a transparent or translucent material, and a lamp housing configured for connection to a front end of a vehicle body, with the lamp housing defining lamp cavities in conjunction with the outer lens. The lamp assembly also includes a projector assembly having a transparent projector lens positioned aft of the outer lens, and a reflective surface configured to reflect the emitted light through the projector lens. A lighting source is positioned adjacent to and partially within the projector assembly, and has a PCB connected to one or more LEDs.

The anisotropic heat spreader in this embodiment may be constructed of polycrystalline graphite, and has a plurality of legs extending beyond a surface area of the PCBA and into each of the lamp cavities. The heat spreader is configured to direct heat away from an LED junction of the PCB and toward a predetermined lower temperature zone of the lamp cavity, specifically along the length and width of the heat spreader. The heat spreader further has an in-plane thermal conductivity greater than 650 or 700 W/mK, and a thermal conductivity of 1% to 10% of the in-plane thermal conductivity through a thickness of the heat spreader. The thickness ranges from 80 to 120 μm in this particular embodiment.

The above features and advantages and other features and advantages of the present disclosure are readily apparent from the following detailed description of the best modes for carrying out the disclosure when taken in connection with the accompanying drawings.

Figure 1:
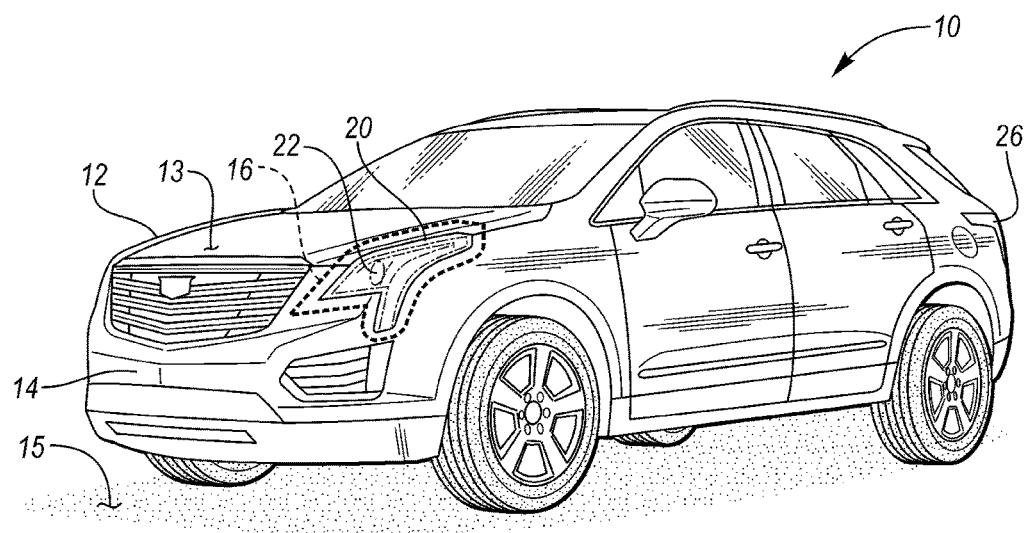
FIG. 1 is a schematic perspective view illustration of an example vehicle having a lamp assembly having an anisotropic heat spreader as disclosed herein.

The present disclosure is susceptible to various modifications and alternative forms. Some representative embodiments are shown in the drawings and described in detail herein. However, novel aspects of the present disclosure are not limited to the particular forms illustrated in the various drawings. Rather, the disclosure is intended to cover modifications, equivalents, combinations, and alternatives falling within the spirit and scope of the disclosure as defined by the appended claims.

DETAILED DESCRIPTION

Referring to the drawings, wherein like reference numbers correspond to like or similar components throughout the several figures, an example motor vehicle 10 is depicted schematically in FIG. 1. The vehicle 10 includes a vehicle body 12 and a hood 13. The vehicle 10 also includes a lamp assembly 16 configured according to the present disclosure. The lamp assembly 16 has an outer lens 20 that surrounds or covers a projector assembly 22 as described in further detail below with reference to FIGS. 2-4.

In the non-limiting example vehicle headlight application of FIG. 1, the lamp assembly 16 may be positioned adjacent to the hood 13 and a fascia 14 of the vehicle 10, and oriented so as to illuminate a road surface 15. Alternatively, the lamp assembly 16 may be used at other locations on or within the vehicle 10, for instance in a rear tail light assembly 26 providing braking or backup indication functions.

While FIG. 1 illustrates an automotive application of the lamp assembly 16, the lamp assembly 16 as described herein is not limited to mobile applications in general or motor vehicle applications in particular. Other stationary or mobile systems may benefit from use of the lamp assembly 16 when the lamp assembly 16 is properly scaled to and configured for use in a particular lighting application. By way of example and not limitation, the lamp assembly 16 may be used in various single-function or multi-function lighting applications, such as commercial or residential building lighting, display or appliance illumination, accent lighting, task lighting, or other applications.

Figure 2:
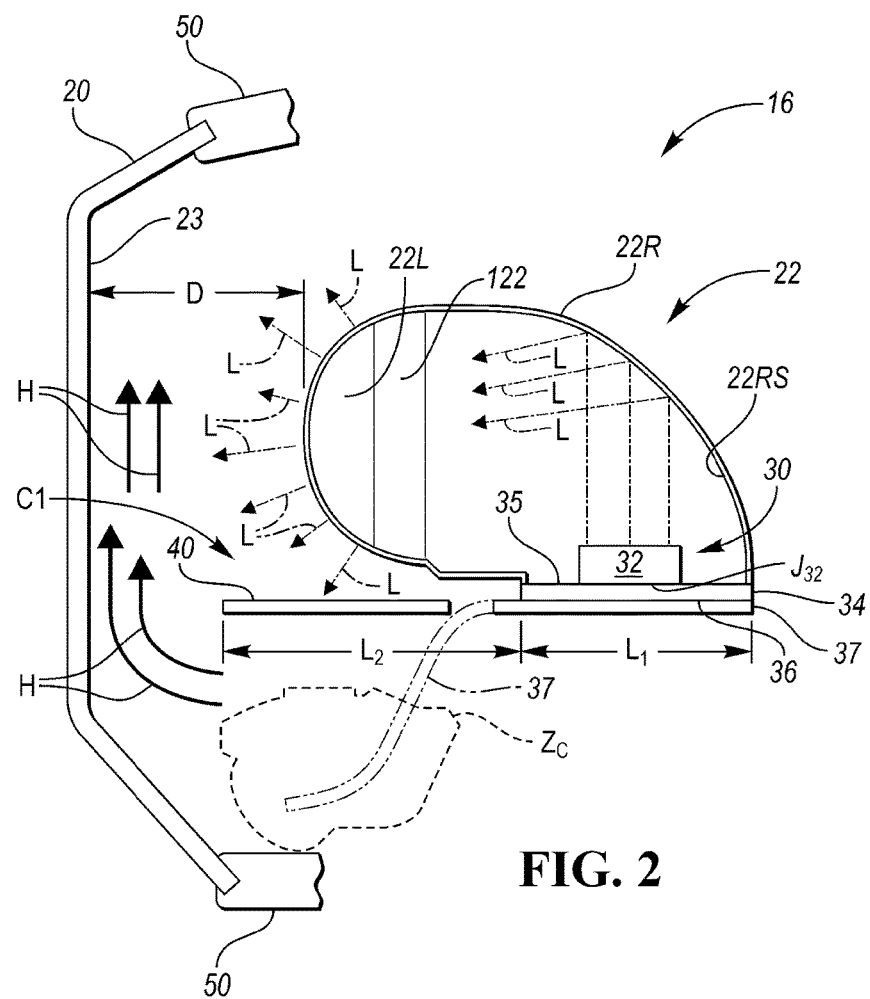
FIG. 2 is a schematic side view illustration of an example lamp assembly according to the present disclosure.

FIG. 2 is a schematic side-view illustration of the lamp assembly 16 of FIG. 1. The lamp assembly 16 includes a lighting source 30 that is automatically or manually activated, e.g., in response to detected ambient lighting levels or selection of a lighting function. When so activated, the lighting source 30 emits visible light (arrows L). In turn, the emitted visible light (arrows L) is directed through the outer lens 20 of the lamp assembly 16 and toward a surface, such as the road surface 15 of FIG. 1.

To this end, the projector assembly 22 is equipped with a projector lens 22L positioned aft of the outer lens 20. The projector assembly 22 may also include an optional reflector 22R having an internal reflective surface 22RS configured to reflect the incident light (arrows L) toward projector assembly 22 and through the outer lens 20. The reflective surface 22RS may be painted, polished, coated, or otherwise provided with a highly reflective chrome or mirror-like surface. The reflector 22R may be bolted or otherwise attached to the projector lens 22L, e.g., using a projector ring 122 or other suitable hardware. In other possible embodiments, the emitted incident light (arrows L) may be directed through the projector lens 22L without reflection, particularly when high-intensity compact configurations of the lighting source 30 are used.

The projector lens 22L is positioned a distance D away from and aft of an inner surface 23 of the outer lens 20. The lighting source 30 is positioned adjacent to and/or partially within the projector housing 22 such that the emitted incident light (arrows L) is able to enter the projector housing 22. In embodiments in which the reflector 22R is used, the emitted light (arrows L) would first reflect off of the reflective surface 22RS. The outer lens 20, which may be constructed of a transparent or a translucent material such as molded plastic or acrylic, defines a first cavity C1 aft of the outer lens 20, doing so in conjunction with a lamp housing 50, only part of which is shown in FIG. 2 for illustrative simplicity. Other lighting components omitted from FIG. 2 may be housed within the first cavity C1, such as electrical wiring, connectors, heat sinks, electric fans, or indicator bulbs.

The lighting source 30 may include a printed circuit board (PCB) 34 having primary surfaces 35 and 36. Surface 35 is electrically connected to one or more LEDs 32 in the illustrated embodiment, with the PCB 34 forming an electronic control board regulating operation of the LEDs 32. Together, the LEDs 32 and the PCB 34 form an LED chip or PCB assembly, with the number, arrangement, and color of the LEDs 32 varying with the desired lighting application.

The lighting source 30 is connected to the anisotropic heat spreader 37 noted above. The heat spreader 37 prior to installation into the lamp assembly 16 may be a generally planar structure that is then bent, shaped, and/or contoured so as to direct heat from a high-temperature LED junction $J_{32}$ into a lower temperature zone or zones of the cavity C1, such as an example cold zone $Z_C$. The heat spreader 37 may be constructed as a flexible sheet of polycrystalline graphite, diamond, or other suitable material having the desired application-specific anisotropic properties.

Being anisotropic, the heat spreader 37 exhibits significantly higher relative thermal conductivity levels across its length and width than its exhibits through its thickness or depth. For instance, it may be desirable to have an in-plane (XY) thermal conductivity of more than 650 or 700 watts per meter-Kelvin (W/mK), i.e., along the length and width or X and Y axes using an example XYZ Cartesian coordinate system. The heat spreader 37 may have a thermal conductivity through its thickness or along its Z axis of, for instance, 1% to 10% of the thermal conductivity in the planar/X and Y directions. The dimensions of the heat spreader 37 may vary with the intended application, with a thickness range of 80-120 μm being representative of a useful example range for certain embodiments. The anisotropic properties of the heat spreader 37 are used to direct heat away from the LED junction $J_{32}$ of FIG. 1 along the length and width of the heat spreader 37 and into the designated cold zone $Z_C$ or other lower temperature areas of the lamp assembly 16, thereby promoting air circulation, avoiding condensation on the inner surface 23 of the outer lens 22, and reducing energy consumption.

In order to help ensure that the heat emanating from the LED junction $J_{32}$ is efficiently transferred via the anisotropic heat spreader 37, an upper surface 40 of the heat spreader 37 may be placed in continuous contact with the bottom surface 36 of the PCB 34 along a length $L_1$ of the PCB 30. Various approaches may be taken to ensure such continuous contact, e.g., heat-resistant adhesives, brackets, or clamps. The heat spreader 37 extends beyond the surface area of the PCB 34 and well into the first cavity C1 and cold zone $Z_C$ such that heat flows to predetermined lower temperature areas between the outer lens 20 and the projector lens 22L, with such heat flow indicated schematically by arrows H in FIG. 2. To facilitate the desired heat flow, the heat spreader 37 may have an overall length $L_2$ that exceeds the length $L_1$ of the PCB 34, with the heat spreader 37 physically routed into the cold zone Z1 or other low-temperature zones within the first cavity C1.

Figure 3:
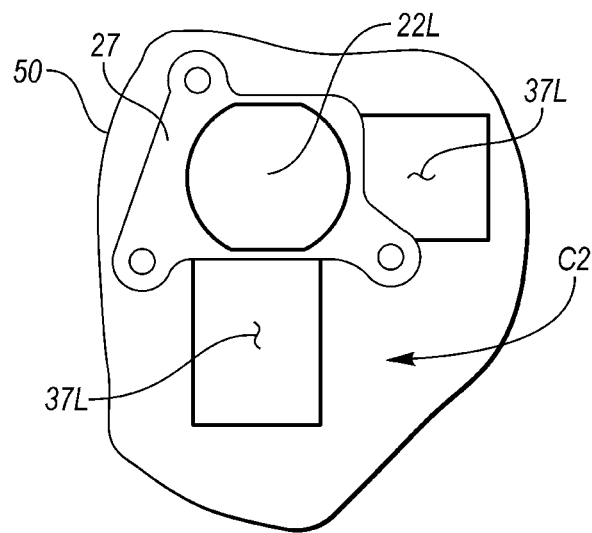
FIG. 3 is a schematic front view illustration of the lamp assembly of FIG. 2.

FIG. 3 schematically depicts a front view of the example lamp assembly 16 of FIG. 2 as the lamp assembly 16 appears once the outer lens 20 (not shown) has been detached and removed from the lamp housing 50. The housing 50 may form an opaque rear portion of a clamshell-like configuration of the lamp assembly 16, thus serving to help provide structural support and sealing of the lamp assembly 16. The omitted outer lens 20 may engage an outer perimeter of the housing 50 as is known in the art. The outer lens 20 in conjunction with the housing 50 may define more than one cavity. For instance, in addition to the first cavity C1 located forward of the projector lens 22L as best shown in FIG. 1, a second cavity C2 may be defined adjacent to the projector lens 22L. The second cavity C2 may house electrical connectors, wires, reflectors, or other lighting components, all of which are omitted for clarity, or the second cavity C2 may be empty.

The anisotropic heat spreader 37 may optionally include multiple legs 37L arranged orthogonally with respect to each other to form an L-shape configuration as shown, with each leg 37L extending a sufficient distance into a respective one of the cavities C1 and C2 for transferring heat to the desired effect. The heat spreader 37 may be secured to the projector assembly 22 via a projector frame 27, e.g., a bracket or other support structure. In some embodiments, the projector lens 22L or the entire projector assembly 22 may pivot or swivel in response to a steering input signal, i.e., in an adaptive headlight application. Therefore, the heat spreader 37 may be expected to pivot in some embodiments, thus requiring a level of compliance or flexibility as well as a secure attachment to moving portions of the projector assembly 22.

Figure 4:
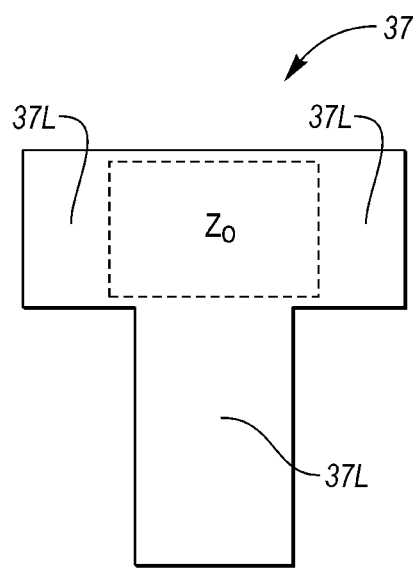
FIG. 4 is a schematic plan view illustration of an example T-shaped anisotropic heat spreader usable in some embodiments of the lamp assembly of FIG. 2.

As shown in FIG. 4, the example L-shape configuration of FIG. 3 may be modified to extend into more than the two cavities C1 and C2. For instance, the anisotropic heat spreader 27 may have a T-shape in plan view as shown or other shapes not depicted, with the particular shape dictated by the configuration of the lamp assembly 16. In all embodiments, an overlap zone $Z_O$ demarcates the overlapping surface area of the heat spreader 37 and the LED junction $J_{32}$ of FIG. 2 to which the heat spreader 37 is clamped, adhered, or otherwise secured.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments may exist for practicing the disclosure defined in the appended claims.

What is claimed is:

1. A lamp assembly comprising:
    an outer lens constructed of a transparent or translucent material;
    a lamp housing defining a lamp cavity in conjunction with the outer lens;
    a projector assembly having a transparent projector lens positioned aft of the outer lens;
    a lighting source positioned adjacent to and partially within the projector assembly, and having a printed circuit board (PCB) connected to one or more light-emitting diodes (LEDs), each of the LEDs being configured to emit light through the projector lens; and
    an anisotropic heat spreader connected to the PCB, and extending beyond a surface area of the PCB and into the lamp cavity to a location between the outer lens and the transparent projector lens to thereby direct heat away from an LED junction of the PCB and into a predetermined lower temperature zone of the lamp cavity, wherein
    the predetermined lower temperature zone is disposed between the outer lens and the transparent projector lens, below the transparent projector lens, and adjacent a bottom of the outer lens, and
    the heat carried by the anisotropic heat spreader circulates air out of the predetermined lower temperature zone and upward across an entire exposed inner surface of the outer lens.

2. The lamp assembly of claim 1, wherein the projector assembly includes a reflective surface configured to reflect the emitted light through the projector lens.

3. The lamp assembly of claim 1, wherein the anisotropic heat spreader is constructed of a polycrystalline material.

4. The lamp assembly of claim 3, wherein the polycrystalline material is polycrystalline graphite.

5. The lamp assembly of claim 4, wherein the polycrystalline graphite has an in-plane thermal conductivity greater than 650 watts per meter-Kelvin (W/mK), and a thermal conductivity through a thickness of the heat spreader of 1% to 10% of the in-plane thermal conductivity.

6. The lamp assembly of claim 5, wherein the thickness of the heat spreader ranges from 80 micrometers (μm) to 120 μm.

7. The lamp assembly of claim 1, wherein the lamp assembly is characterized by an absence of an electronic fan.

8. The lamp assembly of claim 1, wherein the lamp assembly is characterized by an absence of a heat sink.

9. The lamp assembly of claim 1, wherein the lamp housing is configured to connect to a front or rear end of a vehicle body.

10. The lamp assembly of claim 9, wherein the lamp assembly is a headlight assembly and the lamp housing is configured to connect to the front end of the vehicle body.

11. The lamp assembly of claim 1, wherein the anisotropic heat spreader has one or more legs extending into the lamp cavity.

12. The lamp assembly of claim 11, wherein the lamp cavity includes first and second lamp cavities, and wherein the one or more legs includes multiple legs respectively extending into the first and second lamp cavities.

13. A vehicle comprising:
    a vehicle body; and
    a lamp assembly connected to the vehicle body, and including:

an outer lens constructed of a transparent or translucent material;

a lamp housing connected to the outer lens and defining a lamp cavity in conjunction with the outer lens, the lamp housing being further connected to the vehicle body;

a projector assembly having a transparent projector lens positioned aft of the outer lens;

a lighting source positioned adjacent to and partially within the projector assembly, and having a printed circuit board (PCB) connected to one or more light-emitting diodes (LEDs), each of the LEDs being configured to emit light through the projector lens; and an anisotropic heat spreader connected to the PCB, and extending beyond a surface area of the PCB and into the lamp cavity to a location between the outer lens and the transparent projector lens to thereby direct heat away from an LED junction of the PCB and into a predetermined lower temperature zone of the lamp cavity, wherein the predetermined lower temperature zone is disposed between the outer lens and the transparent projector lens, below the transparent projector lens, and adjacent a bottom of the outer lens, and the heat carried by the anisotropic heat spreader circulates air out of the predetermined lower temperature zone and upward across an entire exposed inner surface of the outer lens.

14. The vehicle of claim 13, wherein the anisotropic heat spreader is constructed of a polycrystalline material, has an in-plane thermal conductivity greater than 650 watts per meter-Kelvin (W/mK) and a thermal conductivity through a thickness of the heat spreader of 1% to 10% of the in-plane thermal conductivity, and the thickness is in a range of 80 micrometers (μm) -120 μm.

15. The vehicle of claim 14, wherein the polycrystalline material is polycrystalline graphite.

16. The vehicle of claim 14, wherein the projector assembly includes a reflective surface configured to reflect the emitted light into the projector lens.

17. The vehicle of claim 13, wherein the lamp assembly is characterized by an absence of an electronic fan.

18. The vehicle of claim 13, wherein the lamp assembly is characterized by an absence of a heat sink.

19. The vehicle of claim 13, wherein the lamp cavity includes first and second lamp cavities, and wherein the heat spreader includes first and second legs extending into the respective first and second lamp cavities.

20. A lamp assembly comprising:

an outer lens constructed of a transparent or translucent material;

a lamp housing configured for connection to a front end of a vehicle body, the lamp assembly defining a plurality of lamp cavities in conjunction with the outer lens;

a projector assembly having a transparent projector lens positioned aft of the outer lens, and a reflective surface configured to reflect emitted light into the projector lens;

a lighting source positioned adjacent to and partially within the projector assembly, and having a printed circuit board (PCB) connected to one or more light-emitting diodes (LEDs), each of the LEDs being configured to emit light through the projector lens; and an anisotropic heat spreader constructed of polycrystalline graphite, connected to the PCB, and having a plurality of legs extending beyond a surface area of the PCB and into the lamp cavities with at least one leg of the plurality of legs extending to a location between the outer lens and the transparent projector lens, wherein the heat spreader is configured to direct heat away from an LED junction of the PCB and into a predetermined lower temperature zone of the lamp cavity, has an in-plane thermal conductivity greater than 700 watts per meter-Kelvin (W/mK), has a thermal conductivity through a thickness of the heat spreader of 1% to 10% of the plane thermal conductivity, and the thickness ranges from 80 micrometers (μm) to 120 μm, the predetermined lower temperature zone is disposed between the outer lens and the transparent projector lens, below the transparent projector lens, and adjacent a bottom of the outer lens, and the heat carried by the anisotropic heat spreader circulates air out of the predetermined lower temperature zone and upward across an entire exposed inner surface of the outer lens.

* * * * *